No. 749,873. PATENTED JAN. 19, 1904.
P. F. MEHER.
MEAT CUTTER OR CHOPPER.
APPLICATION FILED NOV. 4, 1901.
NO MODEL.

WITNESSES:
A. R. Appleman
Hartwell P. Heath

INVENTOR
Patrick Frances Meher,
BY J. R. Littell
his ATTORNEY.

No. 749,873. Patented January 19, 1904.

UNITED STATES PATENT OFFICE.

PATRICK FRANCES MEHER, OF BOSTON, MASSACHUSETTS.

MEAT CUTTER OR CHOPPER.

SPECIFICATION forming part of Letters Patent No. 749,873, dated January 19, 1904.

Application filed November 4, 1901. Serial No. 81,056. (No model.)

*To all whom it may concern:*

Be it known that I, PATRICK FRANCES MEHER, a citizen of the United States, residing at Boston, in the county of Suffolk and State of Massachusetts, have invented certain new and useful Improvements in Meat Cutters or Choppers, of which the following is a specification.

This invention relates to meat cutters and choppers; and the object of my invention is to provide a simple and improved cutter and chopper of this class which will possess advantages in point of convenience, inexpensiveness, effectiveness, and general efficiency and which will be of great durability.

Prominently the improved cutter comprises a shank of special form and carrying at one end a horizontal handle and having at its other end portion a series of peculiarly-arranged and secured blades firmly braced.

Figure 1:
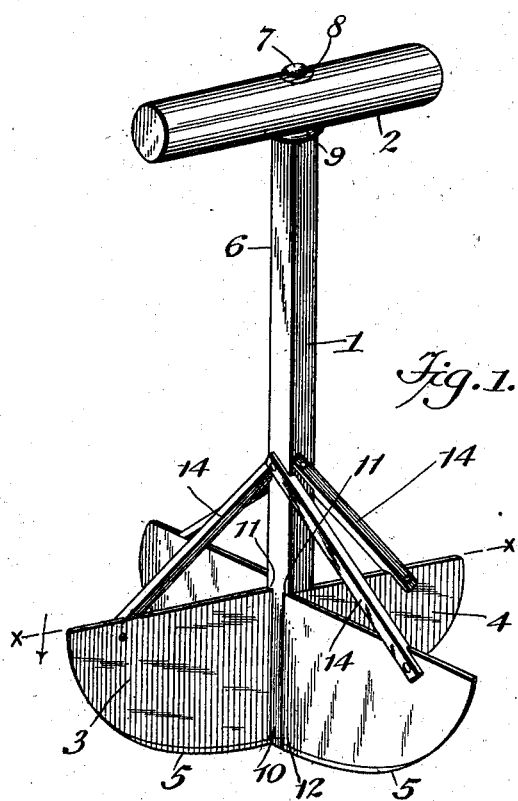
Figure 3:
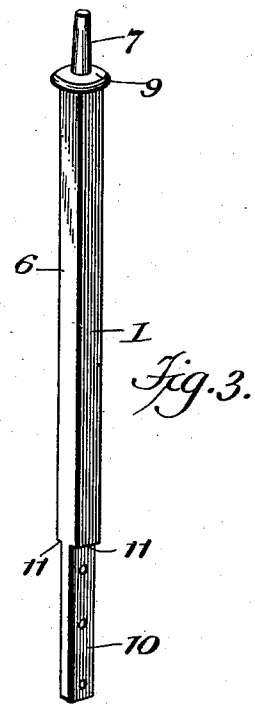
Figure 2:
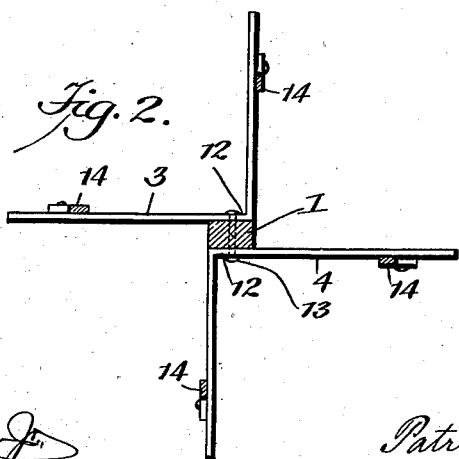

In the drawings, Figure 1 is a perspective view of a meat cutter or chopper constructed in accordance with my invention. Fig. 2 is a horizontal sectional plan view of the cutter or chopper, taken in the plane indicated by the dotted line $x\,x$, Fig. 1. Fig. 3 is a detail view of the shank.

Corresponding parts in all the figures are denoted by the same reference characters.

My improved cutter or chopper has a vertical shank 1 of special form, preferably made of wrought or cast iron, provided with a cross-handle 2, generally of wood, at its upper and at its other end a plurality of bent and braced sheet-steel sections 3 4, presenting a series of cutting-blades 5. The shank 1 consists of a main extended body portion 6, terminating at its upper end in a tapering spindle 7, adapted for insertion in a central vertical opening therefor in the handle 2, a washer 8 being placed over the projecting portion of the spindle above the handle to permit said portion to be spread to securely attach the handle to the shank, a suitable shoulder 9 being formed on the latter at the spindle-base, against which said handle is clamped. At the lower end of the body portion 6 of the shank is a thin flat extension or tang 10, a shoulder 11 being formed at the base of the body 6. Sheet-steel sections 3 4 are each of an appropriate crescent shape and are bent at their centers along a vertical line to each present two integral blades or cutters 5 at right angles with each other. The bent cutter-sections 3 4 are applied against the flat sides of the extension or tang 10, so that the inner angular portions 12 of said sections relatively overlap with the extension 10 between. As thus applied, the blade-sections are firmly secured in position by rivets 13, which pass through the three thicknesses represented by the overlapping portions 12 and extension or tang 10.

Obviously by securing the cutter-sections so that the top edges of their overlapping portions 12 bear against the shoulder 11 the latter thereby reinforces the blades against the upward thrust incurred in use, and consequently relieves the rivets from strain. In addition to these provisions the blades 5 of the cutter-sections are individually braced relative to the shank 1 by inclined braces 14, attached both to the blades and said shank.

Of course the improved cutter and chopper will be equally serviceable for vegetables and other uses where either a similar cutting or chopping action is desired.

Having thus described my invention, I desire to secure by Letters Patent—

A meat and vegetable cutter comprising a stem, recesses formed in the lower end on opposite sides, cutting-blades formed in one piece and each comprising vertical wings at right angles to each other, one wing of each of said blades seated in a recess, and extending to the lower end of the stem and said blades being located in different vertical planes and the vertical surfaces being flush with the vertical surfaces of the stem, bolts passing through two parallel wings of the cutting-blades and through the stem, and braces connecting the other wings with the stem, substantially as described.

In testimony whereof I have signed my name in the presence of the subscribing witnesses.

PATRICK FRANCES MEHER.

Witnesses:
LESTER W. BLANCHARD,
THOMAS CONROY.